United States Patent [19]
Jubb

[11] Patent Number: 5,821,183
[45] Date of Patent: Oct. 13, 1998

[54] SALINE SOLUBLE INORGANIC FIBRES

[75] Inventor: Gary Anthony Jubb, Stourport-On-Severn Worcestershire, Great Britain

[73] Assignee: The Morgan Crucible Company, plc, Windsor, United Kingdom

[21] Appl. No.: 765,818

[22] PCT Filed: Jun. 30, 1995

[86] PCT No.: PCT/GB95/01526

§ 371 Date: Jan. 7, 1997

§ 102(e) Date: Jan. 7, 1997

[87] PCT Pub. No.: WO96/02478

PCT Pub. Date: Feb. 1, 1996

[30] Foreign Application Priority Data

Jul. 13, 1994 [GB] United Kingdom .................. 9414154

[51] Int. Cl.⁶ .................................................. C03C 13/06
[52] U.S. Cl. ................................................. 501/36; 501/38
[58] Field of Search .................................. 501/35, 36, 38

[56] References Cited

U.S. PATENT DOCUMENTS

| | | | |
|---|---|---|---|
| 4,036,654 | 7/1977 | Yale et al. | 501/35 |
| 4,615,988 | 10/1986 | Le Moigne et al. | 501/35 |
| 5,332,699 | 7/1994 | Olds et al. | 501/36 |
| 5,401,693 | 3/1995 | Bauer et al. | 501/36 |
| 5,583,080 | 12/1996 | Guldberg et al. | 501/36 |

FOREIGN PATENT DOCUMENTS

| | | |
|---|---|---|
| 259337 | 8/1970 | U.S.S.R. . |
| 1399556 | 7/1975 | United Kingdom . |

OTHER PUBLICATIONS

Chemicla Abstracts, vol. 115, No. 26, 285711, p. 366, Dec. 1991.

*Primary Examiner*—Karl Group
*Attorney, Agent, or Firm*—Kilpatrick Stockton LLP; Dean W. Russell; Bruce D. Gray

[57] ABSTRACT

Refractory fibres are disclosed for which a vacuum cast preform of the fibre has a shrinkage of 3.5% or less when exposed to 1260° C. for 24 hours. The fibres comprise CaO, $SiO_2$, SrO, and optionally $ZrO_2$ any incidental impurities amounting to less than 2 mol % in total. To achieve the shrinkage performance stated the $SiO_2$ excess (defined as the amount of $SiO_2$ calculated as remaining after the above named constituents are crystallised as silicates) exceeds 26 mol %. Preferred fibres comprise:—CaO less than 33.8 mol %, $SiO_2$ more than 62.1 mol %, and more preferably comprise:—CaO 12.9 to 31.9 mol %, SrO 2.6 to 15.5 mol %, $SiO_2$ 63.2 to 71.3 mol %, $ZrO_2$ 0 to 5.4 mol %.

11 Claims, No Drawings

SALINE SOLUBLE INORGANIC FIBRES

BACKGROUND OF THE INVENTION

1. Field of the Invention

This invention relates to saline soluble, non-metallic, amorphous, inorganic oxide, refractory fibrous materials. The invention particularly relates to glassy fibres having silica as their principal constituent.

2. Description of the Related Art

Inorganic fibrous materials are well known and widely used for many purposes. (e.g. as thermal or acoustic insulation in bulk, mat, or blanket form, as vacuum formed shapes, as vacuum formed boards and papers, and as ropes, yarns or textiles; as a reinforcing fibre for building materials; as a constituent of brake blocks for vehicles). In most of these applications the properties for which inorganic fibrous materials are used require resistance to heat, and often resistance to aggressive chemical environments.

Inorganic fibrous materials can be either glassy or crystalline. Asbestos is an inorganic fibrous material one form of which has been strongly implicated in respiratory disease.

It is still not clear what the causative mechanism is that relates some asbestos with disease but some researchers believe that the mechanism is mechanical and size related. Asbestos of a critical size can pierce cells in the body and so, through long and repeated cell injury, have a bad effect on health. Whether this mechanism is true or not regulatory agencies have indicated a desire to categorise any inorganic fibre product that has a respiratory fraction as hazardous, regardless of whether there is any evidence to support such categorisation. Unfortunately for many of the applications for which inorganic fibres are used, there are no realistic substitutes.

Accordingly there is a demand for inorganic fibres that will pose as little risk as possible (if any) and for which there are objective grounds to believe them safe.

A line of study has proposed that if inorganic fibres were made that were sufficiently soluble in physiological fluids that their residence time in the human body was short; then damage would not occur or at least be minimised. As the risk of asbestos linked disease appears to depend very much on the length of exposure this idea appears reasonable. Asbestos is extremely insoluble.

As intercellular fluid is saline in nature the importance of fibre solubility in saline solution has long been recognised. If fibres are soluble in physiological saline solution then, provided the dissolved components are not toxic, the fibres should be safer than fibres which are not so soluble. The shorter the time a fibre is resident in the body the less damage it can do. H. Förster in 'The behaviour of mineral fibres in physiological solutions' (*Proceedings of* 1982 *WHO IARC Conference,* Copenhagen, Volume 2, pages 27–55(1988)) discussed the behaviour of commercially produced mineral fibres in physiological saline solutions. Fibres of widely varying solubility were discussed.

International Patent Application No. WO87/05007 disclosed that fibres comprising magnesia, silica, calcia and less than 10 wt % alumina are soluble in saline solution. The solubilities of the fibres disclosed were in terms of parts per million of silicon (extracted from the silica containing material of the fibre) present in a saline solution after 5 hours of exposure. The highest value revealed in the examples had a silicon level of 67 ppm. In contrast, and adjusted to the same regime of measurement, the highest level disclosed in the Förster paper was equivalent to approximately 1 ppm. Conversely if the highest value revealed in the International Patent Application was converted to the same measurement regime as the Förster paper it would have an extraction rate of 901,500 mg Si/kg fibre—i.e. some 69 times higher than any of the fibres Förster tested, and the fibres that had the highest extraction rate in the Förster test were glass fibres which had high alkali contents and so would have a low melting point. This is convincingly better performance even taking into account factors such as differences in test solutions and duration of experiment.

International Patent Application No. WO89/12032 disclosed additional fibres soluble in saline solution and discusses some of the constituents that may be present in such fibres. Among such constituents are $ZrO_2$ and this document claims (among other things) processes using fibres of composition (in weight %):—$ZrO_2$ 0.06–10%; $SiO_2$ 35–70%; MgO 0–50%; CaO 0–64.5%. However the patent actually discloses a much more limited range of zirconia containing materials.

European Patent Application No. 0399320 disclosed glass fibres having a high physiological solubility.

Further patent specifications disclosing selection of fibres for their saline solubility include for example European 0412878 and 0459897, French 2662687 and 2662688, PCT WO86/04807, WO90/02713, WO92/09536, and WO93/22251, and U.S. Pat. No. 5,250,488.

The refractoriness of the fibres disclosed in these various prior art documents varies considerably. The maximum service temperature of any of the above mentioned fibres (when used as refractory insulation) is up to 815° C. (1500° F.).

Among saline soluble commercial fibres usable at temperatures higher than 815° C. are SUPERWOOL™ a fibre manufactured by The Morgan Crucible Company plc and which has a maximum use temperature of 1050° C. and a composition of $SiO_2$ 65 wt %; CaO 29 wt %; MgO 5 wt %; $Al_2O_3$ 1 wt %. A similar fibre is INSULFRAX™ a fibre made by Carborundum Company which has a continuous use limit of 1000° C. (1832° F.) and which melts at 1260° C. (2300° F.). This has a composition of $SiO_2$ 65 wt %; CaO 31.1 wt %; MgO 3.2 wt %; $Al_2O_3$ 0.3 wt % and $Fe_2O_3$ 0.3 wt %.

The applicant's earlier International Patent Application WO93/15028 disclosed saline soluble fibres comprising CaO, MgO and $SiO_2$ and optionally $ZrO_2$ usable at temperatures in excess of 1000° C. but gave no indication that fibres could be used at still higher temperatures. That same application also discloses methods of predicting the saline solubility of glasses and for screening for the refractoriness of glasses, although whether such glasses can form fibres is a complex function of many characteristics, e.g. viscosity.

In discussing the above mentioned predictive methods International Patent Application WO93/15028 mentions some compositions containing strontium oxide as a constituent but fibres of these compositions were not made.

The applicants have realised that failure of fibres at high temperature occurs primarily upon devitrification of the fibre; if on devitrification insufficient silica is left the fibres will fail through having a shrinkage of greater than 3.5%. Accordingly the applicants have looked to what materials are formed on devitrification and in their earlier International Patent Application No. PCT/GB94/00053 they disclose refractory fibres comprising CaO, $SiO_2$, MgO, optionally $ZrO_2$, optionally less than 0.75 mol % $Al_2O_3$ and in which the $SiO_2$ excess (defined as the amount of $SiO_2$ calculated as remaining after the above named constituents are crystallised as silicates) exceeds 21.8 mol %.

The physical basis for the importance of $SiO_2$ excess may be that it indicates how much silica is left to maintain a glassy phase on crystallisation of the other constituents as silicate materials. Further, the silicate materials that form on devitrification may become liquid or flow at 1260° C. so causing shrinkage.

SUMMARY OF THE INVENTION

The applicants have found that some systems comprising strontium oxide calcium oxide and silica may form fibres usable at temperatures of up to 1260° C. whereas other strontium containing systems do not form such usable fibres. In particular the applicants have found that partial replacement of SrO for MgO in the $CaO/MgO/(ZrO_2)/SiO_2$ fibres of their earlier application PCT/GB94/00053 does not result in success whereas substitution of SrO for MgO tends to give usable fibres.

Accordingly the present invention provides a refractory fibre for which a vacuum cast preform of the fibre has a shrinkage of 3.5% or less when exposed to 1260° C. for 24 hours and comprising CaO, $SiO_2$, SrO, and optionally $ZrO_2$ any incidental impurities amounting to less than 2 mol % in total, and in which the $SiO_2$ excess (defined as the amount of $SiO_2$ calculated as remaining after the above named constituents are crystallised as silicates) exceeds 26 mol %.

The quantity of potentially fluxing constituents such as alkali metals and other incidental impurities (e.g. iron oxides) should be kept low.

DETAILED DESCRIPTION OF SPECIFIC EMBODIMENTS

From the compositions tested it appears that preferably the fibre comprises:

| | |
|---|---|
| CaO | less than 33.8 mol % |
| $SiO_2$ | more than 62.1 mol %. | and more preferably comprises:

| | |
|---|---|
| CaO | 12.9 to 31.9 mol % |
| SrO | 2.6 to 15.5 mol % |
| $SiO_2$ | 63.2 to 71.3 mol % |
| $ZrO_2$ | 0 to 5.4 mol %. |

The applicants have investigated, for their saline solubility and refractoriness, a range of fibre compositions. These fibres were formed by blowing the molten constituents from a melt stream in a conventional manner but the invention is not limited to blown fibres and also encompasses fibres formed by spinning or any other means.

Tables 1 & 2 show the results of these tests. Table 1 is divided into the $CaO-SrO-ZrO_2-SiO_2$ system, the $CaO-SrO-SiO_2$ system, and some comparative examples (which were never made as fibres). Table 1 indicates for each fibre the linear shrinkages at 800°, 1000°, 1200°, and 1260° C. (not all samples measured at every temperature); mole percent composition (based on the constituents CaO, MgO, SrO, $ZrO_2$, $Al_2O_3$, $TiO_2$ and $SiO_2$); crystalline constituents formed on devitrification (see below); $SiO_2$ excess (calculation for this figure shown below) and, for the $CaO-SrO-SiO_2$ fibres and comparative examples, the calculated $CaSiO_3$ to $SrSiO_3$ ratio. Each sample that has a satisfactory shrinkage of 3.5% or less at 1260° C. is indicated by a composition shown in bold. Those compositions that fail to meet the shrinkage criterion are indicated in plain text.

Table 2 shows for the $CaO-SrO-ZrO_2-SiO_2$ system and the $CaO-SrO-SiO_2$ system the solubilities (as parts per million) of selected constituents of the fibres in saline solution measured by the method described below and shows the total of the named solubilities. This table is ordered in the same manner as Table 1 for convenient comparison.

3 strontium containing systems were investigated. These are:

$CaO-MgO-SrO-SiO_2$
$CaO-SrO-SiO_2$
$CaO-SrO-ZrO_2-SiO_2$

In the $CaO-MgO-SrO-SiO_2$ system very poor results were found—MgO and SrO evidently being incompatible—and so the present invention treats MgO as an incidental impurity that must be held within the 2 mol % total given above. The applicants have good reason to believe that the maximum level for MgO may be as low as 1% and preferably the MgO content is kept as low as possible. To some extent therefore SrO may be treated as being in substitution of MgO in the fibres of PCT/GB94/00053.

The $CaO-SrO-SiO_2$ and $CaO-SrO-ZrO_2-SiO_2$ systems are discussed separately below.

(1) $CaO-SrO-SiO_2$

This is a simple system in that only $CaSiO_3$, $SrSiO_3$ and $SiO_2$ crystallise. Therefore all the CaO forms as $CaSiO_3$ and all the SrO forms as $SrSiO_3$. The resulting excess $SiO_2$ can then be calculated. However $CaSiO_3$ and $SrSiO_3$ form a complete solid solution between them, with the melting point being 1580° C. for $SrSiO_3$ and 1540° C. for $CaSiO_3$, and with a minimum in melting point lying between these extremes. It is reasonable to expect that compositions having significant quantities of both $CaSiO_3$ and $SrSiO_3$ will have lower melting points than either those containing high $CaSiO_3$ and low $SrSiO_3$, or those containing high $SrSiO_3$ and low $CaSiO_3$ contents. Table 1 shows that for those fibres with a $CaSiO_3/SrSiO_3$ ratio of greater than 2 (those fibres lying below line "A") a silica excess of greater than 26 mol % neatly divides the workable fibres (having preform shrinkages of less than 3.5% and shown in bold) from those that are not. For those fibres above line "A" where the $CaSiO_3/SrSiO_3$ ratio is less than 2 a silica excess of 34 mol % is required to divide the workable from the unworkable compositions. However the applicants suspect that there will be a lower limit (perhaps around $CaSiO_3/SrSiO_3$ ratio 0.5) below which a lower silica excess will prevail again.

(2) $CaO-SrO-ZrO_2-SiO_2$

This is a more complicated system than the $CaO-SrO-SiO_2$ system, with at least 5 components crystallising out. These are $2CaO.ZrO_2.4SiO_2$, $6SrO.ZrO_2.5SiO_2$, $CaSiO_3$, $SrSiO_3$ and $SiO_2$.

For those compositions studied all the $ZrO_2$ crystallises as $2CaO.ZrO_2.4SiO_2$ and $6SrO.ZrO_2.5SiO_2$ (if more $ZrO_2$ is present $ZrO_2.SiO_2$ will crystallise also). To fit the relative amounts of phases indicated by X-ray analysis the assumption has been made that the thermodynamics of formation of the $2CaO.ZrO_2.4SiO_2$ and $6SrO.ZrO_2.5SiO_2$ phases are very similar and that the distribution of $ZrO_2$ between these phases can be dealt with statistically. The relative ratios of these phases is then determined by the ratios of the CaO and SrO of the initial composition. The issue is further complicated by the fact that in these phases there are 2CaO's per $ZrO_2$ and 6SrO's per $ZrO_2$ respectively i.e. 3 times more SrO to CaO is required to form equal amounts of $2CaO.ZrO_2.4SiO_2$ and $6SrO.ZrO_2.5SiO_2$. Therefore to calculate how the $ZrO_2$ is split between $2CaO.ZrO_2.4SiO_2$ and $6SrO.ZrO_2.5SiO_2$ the applicants calculate the ratio of CaO/

SrO and multiply by 3, because the CaO is 3 times more likely to form $2CaO.ZrO_2.4SiO_2$ than SrO is to form $6SrO.ZrO_2.5SiO_2$. The $ZrO_2$ content is divided by this figure to give the amount of $6SrO.ZrO_2.5SiO_2$ produced. The remaining $ZrO_2$ forms $2CaO.ZrO_2.4SiO_2$. (Of course if there is sufficient $ZrO_2$ to exhaust either the CaO or SrO the calculation must be modified accordingly). Now any remaining CaO forms $CaSiO_3$ and any remaining SrO forms $SrSiO_3$. The remaining excess $SiO_2$ can then be calculated.

With all these SrO containing compositions there will be inevitable discrepancies around the boundary areas. Small changes in the composition of only 0.1–0.2% are usually sufficient to be the difference between failure and pass at the boundary. In these systems there are considerable difficulties in analysing for SrO, CaO and $SiO_2$ together by X-ray fluorescence (XRF) because their XRF spectra interfere with each other thereby making it difficult to construct an accurate quantitative XRF programme for these systems. This means the accuracy of the reported compositions is less than would be expected for general XRF samples.

These factors may explain why two compositions (F29 and F16) in the $CaO-SrO-ZrO_2-SiO_2$ system show as failures when their excess $SiO_2$ figure would indicate them as being potentially useful fibres.

Under the heading "Comparative compositions" in Table 1 are shown two types of material. Those with the prefix "SCS" are compositions mentioned in WO/93/15028 as being potential refractory glass forming compositions. None of these fibres were made and as will be seen from the figures for excess $SiO_2$ given would not fall within the scope of the present application. The compositions shown with the prefix "BS" are fibres made containing appreciable amounts of both MgO and SrO and as can be seen these materials have an unsatisfactory shrinkage. Silica excesses have not been calculated for these compositions.

The applicants have looked to the various incidental impurities that can occur in inorganic oxide refractory fibres (e.g. alkali oxides and iron oxide) and have found that the impurity levels that can be tolerated vary according to the proportions of the main constituents of the fibre. Fibres containing high levels of $ZrO_2$ for example can tolerate higher levels of $Na_2O$ or $Fe_2O_3$ than fibres with low levels of $ZrO_2$. Accordingly the applicants propose a maximum level of incidental impurities of 2 mol %, the maximum level that will be tolerable will however vary as mentioned above.

The following describes in detail the methods used to measure shrinkage and solubility.

Shrinkage was measured by proposed ISO standard ISO/TC33/SC2/N220 (equivalent to British Standard BS 1920, part 6,1986) with some modifications to account for small sample size. The method in summary comprises the manufacture of vacuum cast preforms, using 75 g of fibre in 500 $cm^3$ of 0.2% starch solution, into a 120×65 mm tool. Platinum pins (approximately 0.1–0.3 mm diameter) were placed 100×45 mm apart in the 4 corners. The longest lengths (L1 & L2) and the diagonals (L3 & L4) were measured to an accuracy of ±5 $\mu$m using a travelling microscope. The samples were placed in a furnace and ramped to a temperature 50° C. below the test temperature at 400° C./hour and ramped at 120° C./hour for the last 50° C. to test temperature and left for 24 hours. The shrinkage values are given as an average of the 4 measurements.

It should be noted that although this is a standard way of measuring shrinkage of fibre it has an inherent variability in that the finished density of the preform may vary depending on casting conditions. Further it should be noted that fibre blanket will usually have a higher shrinkage than a preform made of the same fibre. Accordingly the 3.5% figure mentioned in this specification is likely to translate as a higher shrinkage in finished blanket.

Solubility was measured by the following method.

The fibre was first chopped—2.5 g of fibre (deshotted by hand) was liquidised with 250 $cm^3$ of distilled water in a domestic Moulinex (Trade Mark) food blender for 20 seconds. The suspension was then transferred to a 500 $cm^3$ plastic beaker and allowed to settle after which as much liquid as possible was decanted and the remaining liquid removed by drying in an oven at 110° C.

The solubility test apparatus comprised a shaking incubator water bath, and the test solution had the following composition:

| Compound | Name | Grams |
|---|---|---|
| NaCl | Sodium chloride | 6.780 |
| $NH_4Cl$ | Ammonium chloride | 0.540 |
| $NaHCO_3$ | Sodium bicarbonate | 2.270 |
| $Na_2HPO_4.H_2O$ | Disodium hydrogen phosphate | 0.170 |
| $Na_3C_6H_5O_7.2H_2O$ | Sodium citrate dihydrate | 0.060 |
| $H_2NCH_2CO_2H$ | Glycine | 0.450 |
| $H_2SO_4$ s.g. 1.84 | Sulphuric acid | 0.050 |

The above materials were diluted to 1 liter with distilled water to form a physiological-like saline solution.

0.500 grams ±0.0003 grams of chopped fibre was weighed into a plastic centrifuge tube and 25 $cm^3$ of the above saline solution added. The fibre and saline solution was shaken well and inserted into the shaking incubator water bath maintained at body temperature (37° C.±1° C.). The shaker speed was set at 20 cycles/minute.

After the desired period (usually 5 hours or 24 hours) the centrifuge tube was removed and centrifuged at 4500 revs/minute for approximately 5 minutes. Supernatant liquid was then drawn off using a syringe and hypodermic needle. The needle was then removed from the syringe, air expelled from the syringe, and the liquid passed through a filter (0.45 micron cellulose nitrate membrane filter paper [WCN type from Whatman Labsales Limited]) into a clean plastic bottle. The liquid was then analysed by atomic absorption using a Thermo Jarrell Ash Smith - Hiefje II machine.

The operating conditions were as follows using a nitrous oxide and acetylene flame:

| ELEMENT | WAVELENGTH (nm) | BAND WIDTH | CURRENT (mA) | FLAME |
|---|---|---|---|---|
| Al | 309.3 | 1.0 | 8 | Fuel Rich |
| $SiO_2$ | 251.6 | 0.3 | 12 | Fuel Rich |
| CaO | 422.7 | 1.0 | 7 | Fuel Lean |
| MgO | 285.2 | 1.0 | 3 | Fuel Lean |
| SrO | 460.7 | 0 | 12 | Fuel Lean |

The procedure and standards adopted for determining the above elements were as set out below.

$SiO_2$ can be determined without dilution up to 250 ppm concentration (1 ppm 1 mg/Liter). Above this concentration an appropriate dilution was made volumetrically. A 0.1% KCl solution (0.1 g in 100 $cm^3$) was added to the final dilution to prevent ionic interference. NB If glass apparatus is used, prompt analysis is necessary.

From a stock solution of 1000 ppm pure ignited silica (99.999%) (fused with $Na_2CO_3$ at 1200° C. for 20 minutes in a platinum crucible (0.2500 g $SiO_2$/2 g $Na_2CO_3$) and dissolved in dilute hydrochloric acid (4 molar) made up to 250 cm³ with distilled water in a plastic volumetric flask) the following standards were produced:

| STANDARD (ppm SiO₂) | STOCK SOLUTION (cm³) |
|---|---|
| 10.0 | 1.0 |
| 20.0 | 2.0 |
| 30.0 | 3.0 |
| 50.0 | 5.0 |
| 100.0 | 10.0 |
| 250.0 | 25.0 |

Add 0.1% KCl to each standard before making to 100 cm³.

Aluminium may be measured directly from the sample without dilution. Standards of 1.0, 5.0 and 10.0 ppm Al may be used. For calibration readings are multiplied by 1.8895 to convert from Al to $Al_2O_3$.

A standard Al atomic absorption solution (e.g. BDH 1000 ppm Al) was bought and diluted using an accurate pipette to the desired concentration. 0.1% KCl was added to prevent ionic interference.

Calcium may require dilutions on the sample before determination can be carried out (i.e. ×10 and ×20 dilutions). Dilutions must contain 0.1% KCl.

A standard Ca atomic absorption solution (e.g. BDH 1000 ppm Ca) was diluted with distilled water and an accurate pipette to give standards of 0.5, 4.0 and 10.0 ppm. 0.1% KCl is added to prevent ionic interference. To convert readings obtained from Ca to CaO a factor of 1.4 was used.

Strontium is measured against a standard atomic absorption solution (Aldrich 970 μm/ml). Three standards are prepared to which 0.1% KCl is added (Sr [ppm] 9.7,3.9 & 1.9). Dilutions of ×10 and ×20 are nromally made to measure Sr level in the sample. SrO is then calculated as 1.183×Sr.

Magnesium may require dilutions on the sample before determinations can be made (i.e. ×10 and ×20). Add 0.1% KCl to each dilution. To convert Mg to MgO multiply by 1.658.

A standard Mg atomic absorption solution (e.g. BDH 1000 ppm Mg) was diluted with distilled water and an accurate pipette to give standards of 0.5, 1.0 and 10.0 ppm Mg. 0.1% KCl was added to prevent ionic interference.

All stock solutions were stored in plastic bottles.

The above has discussed resistance to shrinkage of preforms exposed to 1260° C. for 24 hours. This is an indication of the maximum use temperature of a fibre. In practice fibres are quoted for a maximum continuous use temperature and a higher maximum exposure temperature. It is usual in industry when selecting a fibre for use at a given temperature to choose a fibre having a higher continuous use temperature than that nominally required for the intended use. This is so that any accidental increase in temperature does not damage the fibres. It is quite usual for a margin of 100° to 150° C. to be given. Accordingly this invention extends to use of the claimed fibres at elevated temperatures (i.e. at temperatures where the refractoriness of fibres is important) and not just to use at 1260° C.

It will be evident that incidental impurity levels are preferably kept as low as possible. The applicants surmise that as the various crystalline materials crystallise from the fibres impurities migrate to the grain boundaries and concentrate there. Thus a small impurity can have a very large effect.

TABLE 1

CaO—SrO—ZrO2—SiO2 System

| | Shrinkage | | | | Composition | | | | mol % | | |
|---|---|---|---|---|---|---|---|---|---|---|---|
| Comp. | 800° C. | 1000° C. | 1200° C. | 1260° C. | CaO | MgO | SrO | ZrO2 | Al2O3 | TiO2 | SiO2 |
| F33 | 1.30 | 8.20 | | | 30.2 | 0.9 | 2.6 | 5 | 0.2 | 0.1 | 60.9 |
| F28 | 1.50 | 5.10 | | | 31.6 | 0.9 | 2.6 | 2.4 | 0.3 | 0.1 | 62.1 |
| F15 | 0.40 | 7.70 | | | 27.7 | 0.9 | 2.8 | 5 | 0.1 | 0.1 | 63.4 |
| F34 | 0.10 | 6.00 | | | 24.9 | 0.8 | 5.7 | 4.8 | 0.2 | 0.1 | 63.8 |
| F20 | | 1.40 | 1.90 | 2.50 | 25.8 | 0.8 | 2.7 | 5.4 | 0.1 | 0.1 | 65.2 |
| F1 | 1.10 | 1.50 | | 2.30 | 29.4 | 0.9 | 2.7 | 2.5 | 0.1 | 0.1 | 64.3 |
| F29 | | 2.60 | | 5.80 | 28.8 | 0.8 | 5.5 | 2.5 | 0.2 | | 64.4 |
| F16 | 0.40 | 4.20 | 6.10 | | 22.7 | 0.8 | 5.7 | 5.2 | 0.1 | 0.1 | 65.4 |
| F6 | 0.50 | 0.70 | 1.60 | 1.80 | 27.3 | 0.8 | 2.6 | 2.5 | 0.1 | 0.1 | 66.6 |
| F2 | 0.80 | 1.10 | | 2.80 | 24.3 | 0.8 | 5.7 | 2.5 | 0.1 | 0.1 | 66.7 |
| F24 | | 0.50 | 1.10 | 1.50 | 23.2 | 0.8 | 2.7 | 5.2 | 0.1 | 0.1 | 68 |
| F21 | | 0.60 | 1.60 | 2.70 | 20.2 | 0.8 | 5.7 | 5.4 | 0.1 | 0.1 | 67.7 |
| F11 | −0.10 | 0.30 | 0.90 | 1.40 | 25.3 | 0.8 | 2.4 | 2.4 | 0.1 | 0.1 | 68.4 |
| F7 | 0.30 | 0.70 | 1.30 | 1.90 | 22.3 | 0.6 | 5.6 | 2.6 | 0.1 | 0.1 | 68.8 |
| F3 | 0.30 | 0.70 | | 2.50 | 18.8 | 0.5 | 8.8 | 2.7 | 0.1 | 0.1 | 69 |
| F25 | | 0.40 | 0.90 | 1.10 | 17.7 | 0.7 | 5.8 | 5.3 | 0.1 | 0.1 | 70.6 |
| F12 | −0.20 | 0.50 | 0.60 | 1.00 | 19.6 | 0.8 | 5.8 | 2.6 | 0.1 | 0.1 | 71.3 |

| Comp. | SrO.ZrO2.2SiO2 | 2CaO.ZrO2.4SiO2 | 6SrO.ZrO2.5SiO2 | CaSiO3 | SrZiO3 | Excess SiO2 |
|---|---|---|---|---|---|---|
| F33 | None | 4.86 | 0.14 | 20.49 | 1.74 | 18.53 |
| F28 | None | 2.33 | 0.07 | 28.93 | 2.21 | 23.30 |
| F15 | None | 4.83 | 0.17 | 18.04 | 1.19 | 23.41 |
| F34 | None | 4.43 | 0.37 | 18.03 | 3.50 | 24.50 |
| F20 | None | 5.21 | 0.19 | 15.38 | 1.57 | 28.47 |
| F1 | None | 2.42 | 0.08 | 24.55 | 2.24 | 27.43 |
| F29 | None | 2.33 | 0.17 | 21.94 | 4.47 | 27.82 |
| F16 | None | 4.76 | 0.44 | 13.17 | 3.09 | 21.91 |
| F6 | None | 2.42 | 0.08 | 22.46 | 2.12 | 31.94 |
| F2 | None | 2.30 | 0.20 | 19.89 | 4.53 | 32.29 |
| F24 | None | 5.00 | 0.20 | 13.20 | 1.49 | 32.31 |
| F21 | None | 4.99 | 0.51 | 10.42 | 2.85 | 32.52 |

TABLE 1-continued

| | | | | | | |
|---|---|---|---|---|---|---|
| F11 | None | 2.31 | 0.09 | 20.68 | 2.35 | 35.68 |
| F7 | None | 2.39 | 0.22 | 17.54 | 4.29 | 38.35 |
| F3 | None | 2.29 | 0.42 | 14.24 | 8.27 | 37.28 |
| F25 | None | 4.74 | 0.56 | 9.22 | 2.25 | 38.38 |
| F12 | None | 2.35 | 0.25 | 14.90 | 4.11 | 41.64 |

CaO—SrO—SiO2 System

| | Shrinkage | | | | Composition | | | mol % | | | |
|---|---|---|---|---|---|---|---|---|---|---|---|
| Comp. | 800° C. | 1000° C. | 1200° C. | 1260° C. | CaO | MgO | SrO | ZrO2 | Al2O3 | TiO2 | SiO2 |
| E29 | 2.20 | 3.90 | | 5.70 | 23.3 | 0.6 | 11.8 | | 0.2 | | 64 |
| E30 | 1.20 | 2.60 | 4.00 | 4.70 | 17.8 | 0.5 | 15.2 | 0.1 | 0.2 | 0.1 | 68.2 |
| E19 | 0.90 | 1.20 | 1.90 | 1.70 | 20 | 0.6 | 12 | 0.1 | 0.3 | | 66.9 |
| E4 | 0.40 | 1.40 | | 0.60 | 19 | 0.5 | 11.5 | 0.2 | 0.1 | 0.1 | 68.7 |
| E20 | 0.30 | 1.00 | 1.10 | 1.20 | 14.8 | 0.7 | 15.5 | 0.1 | 0.3 | | 68.6 |
| E5 | 0.30 | 0.40 | | 0.50 | 12.9 | 0.3 | 15.5 | 0.1 | 0.1 | 0.1 | 71 |
| E26 | 1.50 | 1.20 | | 4.90 | 38.2 | 1 | 2.6 | | 0.2 | | 57.9 |
| E27 | 1.30 | 2.00 | 4.90 | 7.90 | 33.8 | 0.9 | 5.6 | | 0.2 | | 59.5 |
| E16 | 1.10 | 1.70 | 5.10 | 3.50 | 36.2 | 0.9 | 2.6 | | 0.2 | 0.1 | 60 |
| E28 | 2.80 | 5.70 | | 7.90 | 28.6 | 0.9 | 8.2 | | 0.2 | | 62.1 |
| E17 | 0.90 | 1.00 | 2.30 | 2.90 | 30.1 | 0.8 | 5.7 | | 0.3 | | 63.2 |
| E6 | 0.50 | 0.70 | | 0.20 | 32 | 0.9 | 2.6 | | 0.2 | | 64.2 |
| E1 | 0.90 | 1.00 | | 1.70 | 31.9 | 0.8 | 2.6 | | 0.2 | 0.1 | 64.4 |
| E18 | 0.70 | 1.40 | 1.30 | 1.40 | 25.3 | 0.6 | 8.8 | 0.1 | 0.3 | | 65 |
| E2 | | 1.00 | | 2.50 | 27.4 | 0.8 | 5.4 | 0.1 | 0.2 | 0.1 | 66.1 |
| E7 | | 0.60 | | 0.80 | 26.9 | 0.6 | 5.7 | | 0 2 | 0.1 | 66.5 |
| E11 | 0.20 | 0.70 | 1.30 | 0.80 | 29.7 | 0.7 | 2.6 | | 0.2 | 0.1 | 66.6 |
| E3 | 0.50 | 1.00 | 1.50 | 1.50 | 22.4 | 0.6 | 8.3 | 0.1 | 0.1 | 0.1 | 68.4 |
| E12 | 0.20 | 0.60 | | 0.90 | 23.5 | 0.6 | 5.7 | 0.2 | 0.4 | | 69.7 |

| Comp. | SrO.ZrO2.2SiO2 | 2CaO.ZrO2.4SiO2 | 6SrO.ZrO2.5SiO2 | CaSiO3 | SrZiO3 | Excess SiO2 | CaSiO3/SrSiO3 ratio |
|---|---|---|---|---|---|---|---|
| E29 | None | None | None | 23.33 | 11.81 | 28.86 | 1.98 |
| E30 | None | None | None | 17.77 | 15.17 | 33.26 | 1.17 |
| E19 | None | None | None | 20.04 | 12.05 | 34.91 | 1.66 |
| E4 | None | None | None | 19.99 | 11.47 | 39.25 | 1.65 |
| E20 | None | None | None | 14.78 | 15.49 | 39.35 | 0.95 |
| E5 | None | None | None | 12.93 | 15.47 | 42.61 | 0.84 |
| E26 | None | None | None | 38.25 | 2.64 | 17.02 | 14.50 |
| E27 | None | None | None | 33.76 | 5.57 | 20.17 | 8.06 |
| E16 | None | None | None | 36.22 | 2.64 | 21.14 | 13.74 |
| E28 | None | None | None | 28.57 | 8.19 | 25.34 | 3.49 |
| E17 | None | None | None | 30.11 | 5.65 | 27.44 | 5.33 |
| E6 | None | None | None | 32.01 | 2.65 | 29.54 | 12.09 |
| E1 | None | None | None | 31.95 | 2.85 | 29.90 | 12.03 |
| E18 | None | None | None | 25.29 | 8.77 | 30.95 | 2.88 |
| E2 | None | None | None | 27.41 | 5.41 | 33.29 | 5.07 |
| E7 | None | None | None | 26.94 | 5.87 | 33.99 | 4.75 |
| E11 | None | None | None | 29.70 | 2.84 | 34.28 | 11.25 |
| E3 | None | None | None | 22.37 | 8.34 | 37.99 | 2.68 |
| E12 | None | None | None | 23.55 | 5.85 | 40.50 | 4.17 |

Comparative compositions

| | Shrinkage | | | | Composition | | | mol % | | | |
|---|---|---|---|---|---|---|---|---|---|---|---|
| Comp. | 800° C. | 1000° C. | 1200° C. | 1260° C. | CaO | MgO | SrO | ZrO2 | Al2O3 | TiO2 | SiO2 |
| SCS(A) | | | | | 22.4 | | 25.7 | | | | 51.9 |
| SCS(C) | | | | | 35 | | 12.6 | | | | 52.4 |
| SCS(B) | | | | | 11.1 | | 38.1 | | | | 50.8 |
| BS-2 | 0.60 | 1.30 | | 7.50 | 9.6 | 18.2 | 5.3 | 0.1 | 0.1 | 0.1 | 66.6 |
| BS-1 | | 1.30 | | 3.90 | 14.4 | 17.8 | 2.3 | 0.3 | 0.2 | 0.1 | 64.8 |
| BS-4 | 0.40 | 1.30 | | 12.50 | 9.8 | 14.8 | 5.4 | 2.9 | 0.1 | 0.1 | 67 |
| BS-3 | 0.20 | 1.20 | | 4.50 | 14 | 14.4 | 2.5 | 2.8 | 0.1 | 0.1 | 68.2 |
| BS-5 | 0.50 | 1.20 | | 12.90 | 14.3 | 13.3 | 5.2 | 0.3 | 0.1 | 0.1 | 68.7 |
| BS-6 | | 1.10 | | 23.00 | 13.2 | 11.9 | 5.2 | 2.7 | 0.1 | 0.1 | 66.8 |

| Comp. | SrO.ZrO2.2SiO2 | 2CaO.ZrO2.4SiO2 | 6SrO.ZrO2.5SiO2 | CaSiO3 | SrZiO3 | Excess SiO2 | CaSiO3/SrSiO3 ratio |
|---|---|---|---|---|---|---|---|
| SCS(A) | None | None | None | 29.70 | 2.64 | 19.56 | 11.25 |
| SCS(C) | None | None | None | 22.37 | 8.34 | 21.69 | 2.68 |
| SCS(B) | None | None | None | 23.55 | 5.65 | 21.60 | 4.17 |

TABLE 1-continued

BS-2
BS-1
BS-4    Not calculated
BS-3
BS-5
BS-6

TABLE 2

| Comp. | Composition | | | mol % | | | | Solubility (ppm) | | | |
|---|---|---|---|---|---|---|---|---|---|---|---|
| | CaO | MgO | SrO | ZrO2 | Al2O3 | TiO2 | SiO2 | CaO | MgO/SrO | SiO2 | Total |
| CaO—SrO—ZrO2—SiO2 System | | | | | | | | | | | |
| F33 | 30.2 | 0.9 | 2.6 | 5 | 0.2 | 0.1 | 60.9 | 22 | 12 | 29 | 63.00 |
| F28 | 31.6 | 0.9 | 2.6 | 2.4 | 0.3 | 0.1 | 62.1 | 43 | 16 | 78 | 137.00 |
| F15 | 27.7 | 0.9 | 2.8 | 5 | 0.1 | 0.1 | 63.4 | 17 | 11 | 22 | 50.00 |
| F34 | 24.9 | 0.8 | 5.7 | 4.8 | 0.2 | 0.1 | 63.6 | 19 | 14 | 27 | 60.00 |
| F20 | 25.8 | 0.8 | 2.7 | 5.4 | 0.1 | 0.1 | 65.2 | 11 | 10 | 15 | 36.00 |
| F1 | 29.4 | 0.9 | 2.7 | 2.5 | 0.1 | 0.1 | 64.3 | 32 | 14 | 60 | 106.00 |
| F29 | 26.6 | 0.8 | 5.5 | 2.5 | 0.2 | | 64.4 | | | | |
| F16 | 22.7 | 0.8 | 5.7 | 5.2 | 0.1 | 0.1 | 65.4 | 15 | 12 | 17 | 44.00 |
| F6 | 27.3 | 0.8 | 2.6 | 2.5 | 0.1 | 0.1 | 66.6 | 30 | 12 | 53 | 95.00 |
| F2 | 24.3 | 0.6 | 5.7 | 2.5 | 0.1 | 0.1 | 66.7 | 24 | 17 | 48 | 89.00 |
| F24 | 23.2 | 0.8 | 2.7 | 5.2 | 0.1 | 0.1 | 68 | 11 | 10 | 17 | 38.00 |
| F21 | 20.2 | 0.8 | 5.7 | 5.4 | 0.1 | 0.1 | 67.7 | 10 | 12 | 14 | 36.00 |
| F11 | 25.3 | 0.8 | 2.9 | 2.4 | 0.1 | 0.1 | 68.4 | 20 | 12 | 31 | 63.00 |
| F7 | 22.3 | 0.6 | 5.6 | 2.6 | 0.1 | 0.1 | 68.8 | 25 | 19 | 43 | 87.00 |
| F3 | 18.8 | 0.5 | 8.8 | 2.7 | 0.1 | 0.1 | 69 | 8 | 14 | 32 | 54.00 |
| F25 | 17.7 | 0.7 | 5.6 | 5.3 | 0.1 | 0.1 | 70.6 | 13 | 12 | 19 | 44.00 |
| F12 | 19.6 | 0.8 | 5.6 | 2.6 | 0.1 | 0.1 | 71.3 | 19 | 17 | 33 | 69.00 |
| CaO—SrO—SiO2 System | | | | | | | | | | | |
| E29 | 23.3 | 0.6 | 11.8 | | 0.2 | | 64 | 33 | 47 | 103 | 183.00 |
| E30 | 17.8 | 0.5 | 15.2 | 0.1 | 0.2 | 0.1 | 66.2 | 23 | 54 | 92 | 169.00 |
| E19 | 20 | 0.6 | 12 | 0.1 | 0.3 | | 66.9 | 32 | 52 | 88 | 172.00 |
| E4 | 19 | 0.5 | 11.5 | 0.2 | 0.1 | 0.1 | 68.7 | 32 | 50 | 69 | 151.00 |
| E20 | 14.8 | 0.7 | 15.5 | 0.1 | 0.3 | | 68.6 | 20 | 53 | 59 | 132.00 |
| E5 | 12.9 | 0.3 | 15.5 | 0.1 | 0.1 | 0.1 | 71 | 21 | 66 | 54 | 141.00 |
| E26 | 38.2 | 1 | 2.6 | | 0.2 | | 57.9 | | | | |
| E27 | 33.8 | 0.9 | 5.6 | | 0.2 | | 59.5 | 57 | 30 | 148 | 235.00 |
| E16 | 36.2 | 0.9 | 2.6 | | 0.2 | 0.1 | 60 | 61 | 13 | 137 | 211.00 |
| E28 | 28.6 | 0.9 | 8.2 | | 0.2 | | 62 | 50 | 44 | 152 | 246.00 |
| E17 | 30.1 | 0.8 | 5.7 | | 0.3 | | 63.2 | 54 | 27 | 115 | 196.00 |
| E6 | 32 | 0.9 | 2.6 | | 0.2 | | 64.2 | 61 | 16 | 100 | 177.00 |
| E1 | 31.9 | 0.8 | 2.6 | | 0.2 | 0.1 | 64.4 | 71 | 17 | 120 | 208.00 |
| E18 | 25.3 | 0.6 | 8.8 | 0.1 | 0.3 | | 65 | 39 | 37 | 90 | 166.00 |
| E2 | 27.4 | 0.8 | 5.4 | 0.1 | 0.2 | 0.1 | 66 | 62 | 32 | 113 | 207.00 |
| E7 | 26.9 | 0.6 | 5.7 | | 0.2 | 0.1 | 66.5 | 54 | 34 | 90 | 178.00 |
| E11 | 29.7 | 0.7 | 2.6 | | 0.2 | 0.1 | 66.6 | 50 | 12 | 90 | 152.00 |
| E3 | 22.4 | 0.6 | 8.3 | 0.1 | 0.1 | 0.1 | 68.4 | 44 | 41 | 84 | 169.00 |
| E12 | 23.5 | 0.6 | 5.7 | 0.2 | 0.4 | | 69.7 | 44 | 31 | 87 | 162.00 |

What is claimed is:

1. A strontium containing refractory fibre for which a vacuum cast preform of the fiber has a shrinkage of 3.5% or less when exposed to 1260° C. for 24 hours and consisting essentially of CaO, $SiO_2$, SrO, and optionally $ZrO_2$, and wherein any incidental impurities comprising MgO, iron oxides, and alkali metal oxides amount to less than 2 mol % in total, and in which excess $SiO_2$, defined as the amount of $SiO_2$ calculated as remaining after the above named constituents are crystallized as silicates, exceeds 26 mol %.

2. The refractory fibre as claimed in claim 1 wherein the amount of CaO is less than 33.8 mol % and the amount of $SiO_2$ is more than 62.1 mol %.

3. The refractory fibre as claimed in claim 2 wherein:
the amount of CaO is about 12.9 to about 31.9 mol %;
the amount of SrO is about 2.6 to about 15.5 mol %;
the amount of $SiO_2$ is about 63.2 to about 71.3 mol %; and
the amount of $ZrO_2$ is 0 to about 5.4 mol %.

4. The refractory fibre as claimed in claim 1, wherein the amount of MgO is about 1 mol % or less.

5. The refractory fibre as claimed in claim 1, consisting essentially of CaO, SrO, and $SiO_2$, wherein the excess $SiO_2$ remaining after crystallization of CaO as $CaSiO_3$ and crystallization of SrO as $SrSiO_3$ exceeds 26 mol %.

6. The refractory fibre as claimed in claim 5, having a mole ratio of crystallized $CaSiO_3$ to crystallized $SrSiO_3$ of greater than about 2.

7. The refractory fibre as claimed in claim 5, having a mole ratio of crystallized $CaSiO_3$ to crystallized $SrSiO_3$ of less than about 0.5.

8. The refractory fibre as claimed in claim 5, wherein the excess $SiO_2$ exceeds 34 mol %.

9. The refractory fibre as claimed in claim 8, having a mole ratio of crystallized $CaSiO_3$ to crystallized $SrSiO_3$ of between about 0.5 and about 2.

10. The refractory fibre as claimed in claim 1 consisting essentially of CaO, SrO, $SiO_2$, and $ZrO_2$ wherein the excess $SiO_2$ remaining after crystallization of $ZrO_2$ as $6SrO.ZrO_2.5SiO_2$ and $2CaO.ZrO_2.4SiO_2$, crystallization of CaO as $2CaO.ZrO_2.4SiO_2$ and $CaSiO_3$, and crystallization of SrO as $6SrO.ZrO_2.5SiO_2$, is greater than 26 mol %.

11. A method of providing refractory properties to an article comprising:
   (a) selecting a strontium containing refractory fibre for which a vacuum cast preform of the fiber has a shrinkage of 3.5% or less when exposed to 1260° C. for 24 hours and consisting essentially of CaO, $SiO_2$, SrO, and optionally $ZrO_2$, and wherein any incidental impurities comprising MgO, iron oxides, and alkali metal oxides amount to less than 2 mol % in total and in which excess $SiO_2$, defined as the amount of $SiO_2$ calculated as remaining after the above named constituents are crystallized as silicates, exceeds 26 mol %;
   (b) associating the refractory fibre in or with an article; and
   (c) subjecting the fibre and article to an elevated temperature of at least 1000° C.

* * * * *